2,796,445

PROCESS FOR PREPARING METHYLENE BIS PHENOLS

Frank A. V. Sullivan, Glenbrook, Conn., assignor to American Cyanamid Company, New York, N. Y., a corporation of Maine No Drawing. Application November 4, 1954, Serial No. 466,945

4 Claims. (Cl. 260—619)

This invention is concerned with antioxidants. More particularly, it is concerned with 2,2'-methylene-bis-4,6-dialkyl phenols useful as rubber antioxidants. Still more particularly, it is concerned with a new and improved method of preparing 2,2'-methylene-bis-4,6-dialkyl phenols.

In the commercial manufacture of various products, it is necessary to include in the formulation materials which render the whole resistant to deterioration by the action of oxygen. An excellent illustration is the compounding and vulcanization of rubber. Vulcanized products quickly develop altered properties after exposure to oxygen. The rate of deterioration, of course, is dependent upon the oxygen content of the atmosphere in which they are exposed, as well as the temperature, pressure, the presence or absence of sunlight, and the like.

In the manufacture of vulcanized rubber products, various chemical compounds have been employed as antioxidants. Among those which have been found to be particularly outstanding is the class of 2,2'-methylene-bis-4,6-dialkyl phenols. This class of compounds may be represented by the type formula

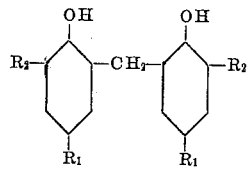

in which $R_1$ is a straight-chain alkyl radical of from 1 to 3 carbon atoms and $R_2$ is a tertiary alkyl radical of from 4 to 8 carbon atoms.

Although this class of compounds is unusually successful as rubber antioxidants, the use thereof has been somewhat restricted because of difficulties encountered in preparation. These compounds have heretofore been prepared by reacting the corresponding dialkyl phenol with formaldehyde in the presence of an organic solvent, for instance, heptane, and an acidic catalyst such as sulfuric acid. This procedure, however, is subject to certain disadvantages. For instance, the yield of product is not as high as desired. Similarly, a product of high purity is difficult to obtain unless pure starting materials are employed. Moreover, for use as rubber antioxidants, these products must be in powder form to allow for easy and thorough dispersion during milling. According to the above procedure, particle size cannot be controlled and the product is usually obtained as large agglomerates. These agglomerates must be purified and then micropulverized into a form suitable for milling. Still further, the described procedures require handling and recovery of large volumes of organic solvent.

More recently there has been disclosed in copending application Serial No. 466,944 filed of even date by Frank A. V. Sullivan, the applicant herein, an improved process of preparing 2,2'-methylene-bis-4,6-dialkyl phenols which comprises reacting the corresponding dialkyl phenol with formaldehyde in the presence of an acid catalyst in an aqueous medium. More specifically, it comprises reacting the dialkyl phenol and formaldehyde, preferably at an elevated temperature, in aqueous medium with an acid catalyst and employing either a sodium alkyl toluene sulfonate or a sodium dialkyl naphthalene sulfonate as a dispersing agent for the phenol. On completion of the reaction, the reaction medium is cooled and the solid crystalline product separated, washed and dried.

The advantages of such a procedure are numerous. For instance, it is capable of giving a very high yield of product of very high purity. It is also capable of such control as to permit separation of a crystalline product rather than agglomerates. Particularly advantageous are the greatly increased production capacity obtained by use of water as a reaction medium rather than an organic solvent and the absence of a recovery system so essential when employing large volumes of organic solvents.

While it is apparent that the above described process is a distinct advance over the prior art processes, nevertheless it is also subject to certain drawbacks. Various of the advantages of the process, for instance, can be obtained only by observance of a strict procedural routine. This routine requires that the dialkyl phenol be added to the mixture of other materials over an extended period of time. If this procedure is not observed, the resultant products tends to agglomerate in a large mass which cannot be stirred. Even when strictly followed, a condensation product separates in the shape of spheres which may measure up to as large as 0.5 inches in diameter. Although such particles may be subsequently mechanically reduced in size to give good dispersion on milling, nevertheless, they are troublesome since they tend to block the discharge valve in the reaction vessel. Moreover, the product is less pure because of the tendency of impurities to associate to a greater extent with larger particles than with particles of smaller size.

Surprisingly, it has now been found, in accordance with the process of this invention, that adherence to such a strict procedural routine is not necessary. Not only does the process of this invention eliminate the procedural restrictions, but, quite surprisingly, it permits recovery in a shorter time of a much finer crystalline product of higher purity and better color. All this is quite unexpectedly accomplished by the presence in the aqueous reaction mixture of a small amount of an organic solvent.

The amount of solvent required to obtain the described advantages is small. As little as 1% by weight of the reaction mixture eliminates the necessity for the slow addition of the dialkyl phenol to a heated mixture of the other materials. Instead, all the materials may initially be brought together and the mixture then raised to the reaction temperature. This small amount of organic solvent is also sufficient to reduce the product to a powder as compared to the large particle size product obtained in the absence of an organic solvent. Amounts of solvent up to about 3% give still finer particles and a product of increased purity and improved color. Beyond about 3%, however, no added effect is noticeable on particle size or purity. Moreover, the use of such larger amounts tends to lower the yield of product. A range, therefore, of from about 1 to about 3% by weight of the reaction mixture, preferably from about 1.5 to about 2.5%, of the organic solvent should be employed. Since the amount of solvent employed is so small, a recovery system is not necessary. However, should it be desired to recover the small amount of solvent, it may be easily steam distilled from the residual liquor.

Any of the various well-known organic solvents may be employed. Heptane, for example, is excellent. Similarly, tetrachloroethane, chlorobenzene, VM and P naphtha and the like may be advantageously employed. The latter is particularly desirable because of its low cost and because it is free of chlorine-containing materials, the presence of which is undesirable in rubber chemicals. The choice of solvent, however, is limited only in that it must be inert with respect to the reaction.

The amount of water employed in the reaction should be at least sufficient to permit agitation. As little as about 150 ml./mol of dialkyl phenol may be employed, but preferably it should be about 200 ml./mol and may be considerably more. Beyond about 350 ml./mol of dialkyl phenol, however, there is little if any added advantage exhibited. In fact, such large amounts tend to adversely affect the particle size of the final product. Accordingly, the amount of water employed should range from about 150–350 ml./mol of dialkyl phenol and, preferably, from about 200–250 ml./mol.

The acid catalyst employed will generally be either sulfuric or hydrochloric acid. Sulfuric acid is preferred, the amount employed for optimum results varying with the strength of acid used. For instance, when using 96% sulfuric acid, the amount of acid may vary from about 2 grams to about 9 grams/mol of dialkyl phenol. Less than about two grams, however, is inadequate and results in a substantial lowering of the yield. On the other hand, more than about 9 grams results in no added advantage. A preferred range of 96% sulfuric acid is from about 4 to about 7 grams/mol of dialkyl phenol. Aryl sulfonic acids may be employed and have the advantage over sulfuric acid that the reaction may be conducted in iron reaction vessels rather than glass-lined vessels. However, any advantage gained is not warranted by the increased cost.

In conducting the process of this invention, it is necessary to employ a dispersing agent for the dialkyl phenol. Such dispersing agent must be one which is not subject to hydrolysis or which is otherwise affected in acidic aqueous solutions. Among those compounds which have been found to be particularly suitable are sodium alkyl toluene sulfonates in which the aliphatic side chain contains at least 10 carbon atoms, preferably 10–12 carbon atoms, for example, sodium decyl toluene sulfonate, and sodium dialkyl naphthalene sulfonates in which the two aliphatic side chains contain at least 5 carbon atoms, for example, sodium diamyl naphthalene sulfonate. These classes of compounds have been found to successfully disperse the dialkyl phenol in such a form that it will readily condense with the formaldehyde.

The amount of dispersing agent employed may vary quite widely and will depend to some extent on the particular dispersing agent employed. In general, however, it has been found that from about 0.5 to about 1.5 grams of dispersing agent per mol of dialkyl phenol give excellent results. While lesser or greater amounts may be employed, if desired, it has been found that the dispersion is not as good with lesser amounts while greater amounts show no added advantage.

The process of this invention is conducted by mixing all of the materials, including the dialkyl phenol and organic solvent, and then preferably heating the mixture to reaction temperature. The condensation proceeds very rapidly, particularly at elevated temperatures at which solid product appears in about 5 to 10 minutes. Yield and purity of product are good after only one hour but smaller particle size is obtained after about 1.5–2 hours. While the temperature at which reaction is conducted may be widely varied, little if any added advantage is gained by operating above about 90° C. After completion of reaction, sodium hydroxide or other suitable neutralizing agent may be introduced and the entire contents drowned in water. The reaction mass may then be centrifuged or otherwise subjected to effect a separation of the solid product. The separated product may then be washed with water to free it of sulfates followed by drying.

The following examples demonstrate the efficacy of the process of this application. These examples are intended as illustrative only and not by way of limitation. Unless otherwise noted, all parts are by weight.

*Example 1*

A mixture comprising 950 parts of water, 50 parts of heptane, 222.5 parts of a 37% formalin solution, 25 parts of a 96% sulfuric acid solution, 10 parts of sodium decyltoluene sulfonate and 820 part of 2-tert-butyl-4-methyl phenol was heated with agitation for two hours at 85–90° C. After neutralization with 64 parts of a 25% sodium hydroxide solution, the reaction mass was centrifuged and the solids washed with water and air dried. A 96.6% yield of fine particles of 2,2'-methylene-bis-(4-methyl-6-tertiary butyl phenol) was obtained having an M. P. of 131–133° C.

*Example 2*

The procedure of Example 1 was repeated except 1500 parts of water and 50 parts of tetrachloroethane were used. A 97.6% yield of product of small particles having a melting point of 130–132° C. was obtained.

*Example 3*

The procedure of Example 1 was again repeated using 50 parts of chlorobenzene as solvent. A 97.4% yield of fine crystalline product having a melting point of 130–132° C. was obtained.

*Example 4*

A mixture comprising 820 parts of 2-tert-butyl-4-methyl phenol, 1,000 parts of water, 50 parts of naphtha, 10 parts of sodium decyl toluene sulfonate, 25 parts of 96% sulfuric acid and 222.5 parts of 37% formalin were heated for one hour at 75–90° C. There were then added 500 parts of water and 65 parts of 25% sodium hydroxide. The resultant reaction mass was centrifuged and the product washed with water and dried. A 98.0% yield of a fine crystalline product was obtained having a melting point of 130–132° C.

*Example 5*

A mixture comprising 46.8 parts of 2-tert-octyl-4-ethyl phenol, 57 parts of water, 2.85 parts of naphtha, 0.5 part of sodium decyl toluene sulfonate, 1.43 parts of 97% sulfuric acid and 8.12 parts of 37% formalin were heated at 90° C. for 1 hour. At the end of this time 25 parts of water was added to the reaction mixture to lower its viscosity, and heating at 90° C. was resumed for 0.5 hour. The reaction mixture was then neutralized with 20% NaOH solution and cooled. The white granular product was separated from the reaction mixture by filtration, and washed and dried. A fine crystalline product in quantitative yield and melting at 70–74° C. was obtained.

*Example 6*

A mixture comprising 328 parts of 2-tert-butyl-4-ethyl phenol, 402 parts of water, 20 parts of naphtha, 4.1 parts of sodium decyl toluene sulfonate, 10.1 parts of 97% sulfuric acid and 80 parts of 37% formalin were heated at 90° C. for five hours. The reaction mixture was cooled and 26.7 parts of 25% aqueous NaOH solution added. The crystalline product was separated from the reaction mixture by filtration, washed free of sulphate and dried, melted at 118–122° C. On recrystallization, the product obtained in near quantitative yield melted at 126–127° C.

I claim:

1. A method of preparing 2,2'-methylene-bis-4,6-dialkyl phenols of the formula

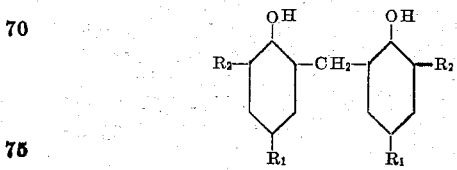

wherein $R_1$ is an alkyl radical of 1–3 carbon atoms and $R_2$ is a tertiary alkyl radical of 4–18 carbon atoms which comprises: reacting a dialkyl substituted phenol with formaldehyde in at least 150 ml. of water per mol of phenol, said 150 ml. of water/mol of phenol being in addition to any present through the use of formaldehyde as an aqueous solution; said water containing during said reaction an acid catalyst, a dispersing agent and at least about 1% by weight of an inert organic solvent.

2. A method according to claim 1 in which the inert organic solvent is present in amount of from about 1–3% by weight of the reaction mixture.

3. A method of preparing 2,2'-methylene-bis-4,6-dialkyl phenols of the formula

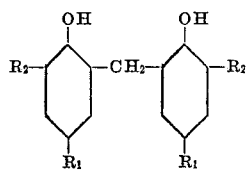

wherein $R_1$ is an alkyl radical of 1–3 carbon atoms and $R_2$ is a tertiary alkyl radical of 4–8 carbon atoms which comprises: forming an aqueous mixture comprising a dialkyl phenol, water in an amount of at least 150 ml. per mol of dialkyl phenol, formaldehyde, an acid catalyst, a dispersing agent and a small amount of an inert organic solvent, maintaining said mixture at an elevated temperature not exceeding about 90° C. until reaction is substantially complete, and separating solid product.

4. A method according to claim 3 in which the inert organic solvent is present in an amount of 1–3% by weight of the reaction mixture.

References Cited in the file of this patent

UNITED STATES PATENTS

| | | |
|---|---|---|
| 2,430,002 | De Groote et al. | Nov. 4, 1947 |
| 2,538,355 | Davis et al. | Jan. 16, 1951 |
| 2,675,366 | Pullman | Apr. 13, 1954 |

FOREIGN PATENTS

| | | |
|---|---|---|
| 711,122 | Great Britain | June 23, 1954 |

---

UNITED STATES PATENT OFFICE

CERTIFICATE OF CORRECTION

Patent No. 2,796,445  June 18, 1957

Frank A. V. Sullivan

It is hereby certified that error appears in the printed specification of the above numbered patent requiring correction and that the said Letters Patent should read as corrected below.

Column 5, line 2, for "4-18" read -- 4-8 --.

Signed and sealed this 13th day of August 1957.

(SEAL)
Attest:

KARL H. AXLINE
Attesting Officer

ROBERT C. WATSON
Commissioner of Patents